(12) United States Patent
Murgatroyd et al.

(10) Patent No.: US 9,023,117 B2
(45) Date of Patent: May 5, 2015

(54) DISPERSE DYE MIXTURES, THEIR PREPARATION AND USE

(71) Applicant: Dystar Colours Distribution GmbH, Frankfurt am Main (DE)

(72) Inventors: Adrian Murgatroyd, Frankfurt am Main (DE); Clemens Grund, Hattersheim (DE); Timo Liebig, Köln (DE); Stefan Neubauer, Köln (DE)

(73) Assignee: Dystar Colours Deutschland GmbH, Frankfurt am Main (DE)

( * ) Notice: Subject to any disclaimer, the term of this patent is extended or adjusted under 35 U.S.C. 154(b) by 0 days.

(21) Appl. No.: 13/622,741

(22) Filed: Sep. 19, 2012

(65) Prior Publication Data

US 2013/0019416 A1 Jan. 24, 2013

Related U.S. Application Data

(63) Continuation of application No. 13/389,672, filed as application No. PCT/EP2010/061821 on Aug. 13, 2010, now abandoned.

(30) Foreign Application Priority Data

Aug. 21, 2009 (DE) .......................... 10 2009 028 780

(51) Int. Cl.
*C09B 67/22* (2006.01)
*C09B 57/00* (2006.01)
(Continued)

(52) U.S. Cl.
CPC .............. *C09B 67/0041* (2013.01); *D06P 3/54* (2013.01); *D06P 5/30* (2013.01); *D06P 1/16* (2013.01); *D06P 1/18* (2013.01); *D06P 1/19* (2013.01)

(58) Field of Classification Search
CPC .............. D01P 1/00; D01P 1/02; D01P 1/04; D01P 1/16; D01P 1/19; D06P 3/00; D06P 3/22; D06P 3/36; D06P 3/42; D06P 3/54; C09B 67/36; C09B 67/38; C09B 67/40; C09B 51/00; C09B 29/00; C09B 46/00; C09B 56/005; C09B 67/0041; C09B 67/0079; C09B 67/008; C09B 57/00; C09D 11/00; C09D 11/02
USPC .............. 8/636, 638, 639, 662, 693, 920, 921, 8/922, 924; 106/31.13, 31.27, 31.43, 106/31.45, 31.51
See application file for complete search history.

(56) References Cited

U.S. PATENT DOCUMENTS

| 4,872,882 A | 10/1989 | Hahnke et al. |
| 5,928,388 A * | 7/1999 | Leaver ............................. 8/638 |
| 2010/0092670 A1* | 4/2010 | Jordan et al. .................. 427/256 |

FOREIGN PATENT DOCUMENTS

DE 102006050642 A1 4/2008
EP 0 033 583 A1 8/1981
(Continued)

OTHER PUBLICATIONS

International Search Report for PCT/EP2010/061821 mailed Feb. 2, 2011.
(Continued)

*Primary Examiner* — Amina Khan
(74) *Attorney, Agent, or Firm* — Drinker Biddle & Reath LLP

(57) ABSTRACT

The present invention provides dye mixtures containing at least one dye of formula (I) and at least one dye of formula (II) where $T^1$, $T^2$, $R^1$ to $R^9$ and n are each as defined in claim 1, processes for their preparation and their use.

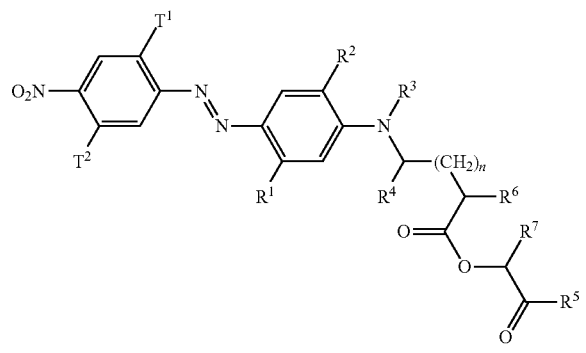

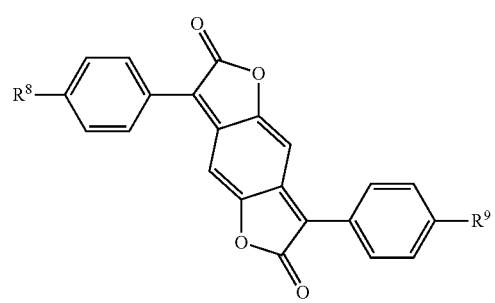

1 Claim, No Drawings

(51) Int. Cl.
  *C09B 46/00* (2006.01)
  *C09B 67/36* (2006.01)
  *C09B 67/38* (2006.01)
  *D06P 3/54* (2006.01)
  *D06P 5/30* (2006.01)
  *D06P 1/16* (2006.01)
  *D06P 1/18* (2006.01)
  *D06P 1/19* (2006.01)

(56) References Cited

FOREIGN PATENT DOCUMENTS

| | | | |
|---|---|---|---|
| EP | 0 305 886 | A2 | 3/1989 |
| EP | 0 397 170 | A1 | 11/1990 |
| EP | 0551725 | A1 | 7/1993 |
| EP | 0598303 | A1 | 5/1994 |
| EP | 0 640 667 | A1 | 3/1995 |
| GB | 909843 | A | 11/1962 |
| JP | 7062260 | A | 3/1995 |
| WO | WO2008/049758 | * | 5/2008 |
| WO | WO-2008/049758 | A2 | 5/2008 |
| WO | WO-2008074719 | A1 | 6/2008 |

OTHER PUBLICATIONS

International Written Opinion for PCT/EP2010/061821.

* cited by examiner

DISPERSE DYE MIXTURES, THEIR PREPARATION AND USE

CROSS-REFERENCE TO RELATED APPLICATIONS

This application is a continuation application of application Ser. No. 13/389,672, filed Feb. 9, 2012, now abandoned, which is incorporated by reference. Application Ser. No. 13/389,672 is a national stage application (under 35 U.S.C. §371) of PCT/EP2010/061821, filed Aug. 13, 2010, which claims benefit of German application 10 2009 028 780.9, filed Aug. 21, 2009.

BACKGROUND OF THE INVENTION

The present invention relates to disperse dyes for dyeing hydrophobic textile materials.

Mixtures of benzodifuranone and disperse azo dyes are already known and are described for example in EP 0 305 886 A2, EP 0 640 667 A1 and WO2008/074719 A1.

In addition, WO2008/049758 A2 discloses disperse azo dyes in which a 2-oxoalkyl ester is linked to the chromophore.

It has now been found that the hereinbelow defined mixtures of benzodifuranone and disperse azo dyes are distinctly improved over the individual dyes in respect of the buildup of the dyeings on polyester and polyester-elastane materials.

The present invention provides dye mixtures containing at least one dye of formula (I)

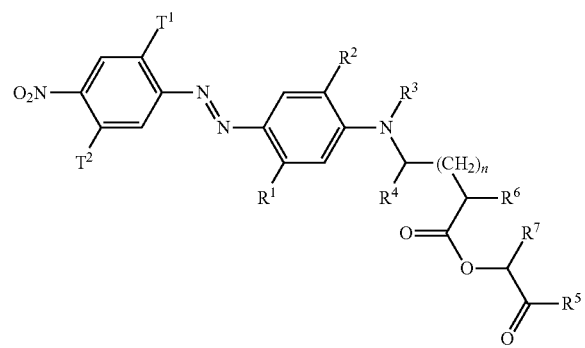

(I)

and at least one dye of formula (II)

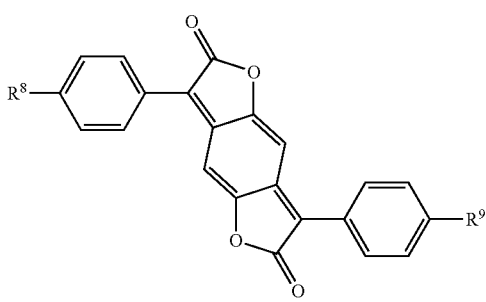

(II)

where
$T^1$ is hydrogen, halogen, trifluoromethyl, cyano, —SCN, —SO$_2$CH$_3$ or nitro;
$T^2$ is hydrogen or halogen;
$R^1$ is hydrogen, $(C_1$-$C_6)$-alkyl, $(C_1$-$C_4)$-alkoxy, halogen, —NHCHO, —NHCO$(C_1$-$C_6)$-alkyl, —NHCOaryl, —NHSO$_2(C_1$-$C_6)$-alkyl or —NHSO$_2$aryl;
$R^2$ is hydrogen or halogen;
$R^3$ is hydrogen, $(C_1$-$C_6)$-alkyl, cyano-, $(C_1$-$C_4)$-alkoxy-, phenoxy- or phenyl-substituted $(C_1$-$C_6)$-alkyl, $(C_3$-$C_4)$-alkenyl or substituted $(C_3$-$C_4)$-alkenyl;
$R^4$ is hydrogen or methyl;
$R^5$ is methyl or ethyl;
$R^6$ is hydrogen or methyl;
$R^7$ is hydrogen or methyl;
n is 0, 1, 2 or 3;
$R^8$ and $R^9$ are each independently hydrogen, $(C_1$-$C_4)$-alkoxy, $(C_2$-$C_4)$-alkenyloxy or —O(CH$_2)_qR^{22}$; and
q is an integer from 1 to 6; and
$R^{22}$ is 2-tetrahydropyranyl, 2-tetrahydrofuranyl, —OR$^{23}$ or —COR$^{24}$; where
$R^{23}$ is hydrogen, $(C_1$-$C_4)$-alkyl, $(C_2$-$C_4)$-alkenyl, substituted or unsubstituted phenyl, $(C_1$-$C_4)$-alkoxy-$(C_1$-$C_4)$-alkyl, phenoxy-$(C_1$-$C_4)$-alkyl, carbonyl-$(C_1$-$C_4)$-alkyl, carbonyl-$(C_2$-$C_4)$-alkenyl, carbonyl phenyl, carbonyl-$(C_1$-$C_4)$-alkoxy-$(C_2$-$C_4)$-alkyl or carbonylphenoxy-$(C_2$-$C_4)$-alkyl; and
$R^{24}$ is $(C_1$-$C_4)$-alkoxy, $(C_2$-$C_4)$-alkenyloxy, substituted or unsubstituted phenyloxy, phenyl-$(C_1$-$C_2)$-alkoxy, phenoxy-$(C_1$-$C_4)$-alkoxy, $(C_2$-$C_4)$-alkenyloxy-$(C_1$-$C_4)$-alkoxy or $(C_1$-$C_4)$-alkoxy-$(C_1$-$C_4)$-alkoxy.

In the context of the present invention, $(C_1$-$C_6)$-alkyl groups may be straight chain or branched and are for example methyl, ethyl, n-propyl, i-propyl, n-butyl, i-butyl, tert-butyl, n-pentyl or n-hexyl. A similar logic holds for alkoxy groups, which are methoxy or ethoxy for example. $(C_3$-$C_4)$-Alkenyl groups are more particularly allyl, $(C_2$-$C_4)$-alkenyl groups are more particularly vinyl or allyl.

Substituents for $(C_3$-$C_4)$-alkenyl are for example halogen and phenyl.

Aryl is more particularly phenyl or naphthyl. Substituents for phenyl or phenoxy are for example halogen, methyl, ethyl, hydroxyethyl, methoxy, ethoxy, hydroxyl and cyano.

—NHSO$_2$aryl is more particularly phenylsulfonylamino. Halogen is preferably chlorine or bromine.

Preferred dye mixtures according to the present invention contain at least one dye of formula (I) where
$T^1$ is hydrogen, chlorine, bromine, trifluoromethyl, cyano or nitro;
$T^2$ is hydrogen or chlorine;
$R^1$ is hydrogen, chlorine, methyl, acetylamino, propionylamino, benzoylamino; methylsulfonylamino, ethylsulfonylamino or phenylsulfonylamino;
$R^2$ is hydrogen or chlorine;
$R^3$ is hydrogen, methyl, ethyl, propyl, butyl, benzyl, phenylethyl, phenoxyethyl, methoxyethyl, cyanoethyl or allyl;
$R^4$, $R^6$ and $R^7$ are each hydrogen;
$R^5$ is methyl; and
n is 0 or 1.

Particularly preferred dye mixtures according to the present invention contain at least one dye of formula (I) where
$T^1$ is hydrogen, chlorine, bromine, trifluoromethyl, cyano or nitro;
$T^2$ is hydrogen or chlorine;
$R^1$ is hydrogen, methyl or acetylamino;
$R^2$ is hydrogen or chlorine;
$R^3$ is hydrogen, methyl, ethyl, n-butyl, benzyl, phenylethyl, phenoxyethyl, cyanoethyl or allyl;
$R^4$, $R^6$ and $R^7$ are each hydrogen;
$R^5$ is methyl; and
n is 0.

Very particularly preferred dye mixtures according to the present invention contain at least one dye of formula (Ia)

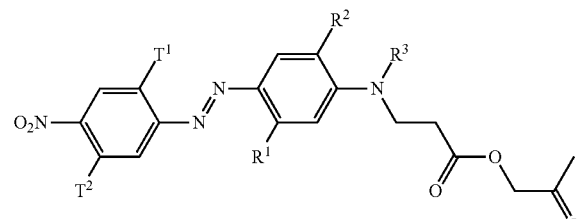

where $T^1$, $T^2$ and $R^1$ to $R^3$ are each as defined in the table which follows:

| | $T^1$ | $T^2$ | $R^1$ | $R^2$ | $R^3$ |
|---|---|---|---|---|---|
| Ia-1 | Cl | H | NHCOCH$_3$ | H | n-C$_4$H$_9$ |
| Ia-2 | H | H | NHCOCH$_3$ | H | n-C$_4$H$_9$ |
| Ia-3 | NO$_2$ | H | NHCOCH$_3$ | H | CH$_2$CH$_3$ |
| Ia-4 | CN | H | NHCOCH$_3$ | H | CH$_2$CH$_3$ |
| Ia-5 | Cl | H | NHCOCH$_3$ | H | CH$_2$CH$_3$ |
| Ia-6 | Br | H | NHCOCH$_3$ | H | CH$_2$CH$_3$ |
| Ia-7 | H | H | NHCOCH$_3$ | H | CH$_2$CH$_3$ |
| Ia-8 | CN | H | NHCOCH$_3$ | H | CH$_2$C$_6$H$_5$ |
| Ia-9 | Cl | H | NHCOCH$_3$ | H | CH$_2$C$_6$H$_5$ |
| Ia-10 | NO$_2$ | H | NHCOCH$_3$ | H | CH$_2$C$_6$H$_5$ |
| Ia-11 | H | H | NHCOCH$_3$ | H | CH$_2$C$_6$H$_5$ |
| Ia-12 | CN | H | NHCOCH$_3$ | H | n-C$_4$H$_9$ |
| Ia-13 | CN | H | NHCOCH$_3$ | H | CH$_2$CH=CH$_2$ |
| Ia-14 | Cl | H | NHSO$_2$CH$_3$ | H | CH$_2$C$_6$H$_5$ |
| Ia-15 | H | H | NHSO$_2$CH$_3$ | H | CH$_2$C$_6$H$_5$ |
| Ia-16 | CN | H | CH$_3$ | H | CH$_2$CH$_3$ |
| Ia-17 | CN | H | CH$_3$ | H | n-C$_4$H$_9$ |
| Ia-18 | Cl | H | CH$_3$ | H | n-C$_4$H$_9$ |
| Ia-19 | Cl | H | CH$_3$ | H | CH$_2$CH$_3$ |
| Ia-20 | Cl | H | H | H | CH$_2$CH$_3$ |
| Ia-21 | Br | H | H | H | CH$_2$CH$_3$ |
| Ia-22 | Cl | Cl | H | H | CH$_2$CH$_3$ |
| Ia-23 | Cl | H | H | H | CH$_2$C$_6$H$_5$ |
| Ia-24 | CN | H | H | H | CH$_2$C$_6$H$_5$ |
| Ia-25 | CF$_3$ | H | H | H | CH$_2$C$_6$H$_5$ |
| Ia-26 | Br | H | H | H | CH$_2$C$_6$H$_5$ |
| Ia-27 | CN | H | H | H | CH$_2$CH$_2$OC$_6$H$_5$ |
| Ia-28 | H | H | CH$_3$ | H | CH$_2$CH$_3$ |
| Ia-29 | Br | H | CH$_3$ | H | CH$_2$CH$_3$ |
| Ia-30 | Cl | Cl | CH$_3$ | H | CH$_2$CH$_3$ |
| Ia-31 | Cl | Cl | H | H | CH$_2$C$_6$H$_5$ |
| Ia-32 | H | H | H | Cl | H |
| Ia-33 | Cl | H | H | Cl | H |
| Ia-34 | H | H | H | Cl | H |
| Ia-35 | NO$_2$ | H | NHCOCH$_3$ | Cl | H |
| Ia-36 | H | H | NHCOCH$_3$ | Cl | H |
| Ia-37 | Cl | H | NHCOCH$_3$ | Cl | H |
| Ia-38 | CN | H | NHCOCH$_3$ | Cl | H |
| Ia-39 | CN | H | H | H | CH$_2$CH$_2$CN |
| Ia-40 | CF$_3$ | H | H | H | CH$_2$CH$_2$CN |
| Ia-41 | Cl | H | H | H | CH$_2$CH$_2$CN |
| Ia-42 | CN | H | CH$_3$ | H | CH$_2$CH$_2$CN |
| Ia-43 | CN | H | CH$_3$ | Cl | CH$_2$CH$_2$CN |
| Ia-44 | CF$_3$ | H | H | Cl | H |
| Ia-45 | CN | H | H | Cl | H |
| Ia-46 | CF$_3$ | H | NHCOCH$_3$ | Cl | H |
| Ia-47 | Cl | H | H | H | CH$_2$CH$_2$C$_6$H$_5$ |
| Ia-48 | CN | H | H | H | CH$_2$CH$_2$C$_6$H$_5$ |
| Ia-49 | NO$_2$ | H | H | H | CH$_2$C$_6$H$_5$ |

Further preferred dye mixtures according to the present invention contain at least one dye of formula (II) where $R^8$ and $R^9$ are each independently hydrogen, (C$_1$-C$_4$)-alkoxy or —O(CH$_2$)$_q$R$^{22}$ where
q is an integer from 1 to 3; and
$R^{22}$ is 2-tetrahydropyranyl, 2-tetrahydrofuranyl, —OR$^{23}$ or —COR$^{24}$; where
$R^{23}$ is hydrogen or (C$_1$-C$_4$)-alkoxy-(C$_1$-C$_4$)-alkyl; and
$R^{24}$ is (C$_1$-C$_4$)-alkoxy-(C$_1$-C$_4$)-alkoxy.

Further particularly preferred dye mixtures according to the present invention contain at least one dye of formula (II) where
$R^8$ is hydrogen, (C$_1$-C$_4$)-alkoxy or —O(CH$_2$)$_q$R$^{22}$, where
q is an integer from 1 to 3; and
$R^{22}$ is 2-tetrahydropyranyl, 2-tetrahydrofuranyl, —OR$^{23}$ or —COR$^{24}$; where
$R^{23}$ is hydrogen or (C$_1$-C$_4$)-alkoxy-(C$_1$-C$_4$)-alkyl; and
$R^{24}$ is (C$_1$-C$_4$)-alkoxy-(C$_1$-C$_4$)-alkoxy;
and
$R^9$ is hydrogen, (C$_1$-C$_4$)-alkoxy or —O(CH$_2$)$_q$R$^{22}$, where
q is an integer from 1 to 3; and
$R^{22}$ is —COR$^{24}$ and
$R^{24}$ is (C$_1$-C$_4$)-alkoxy-(C$_1$-C$_4$)-alkoxy.

Further very particularly preferred dye mixtures according to the present invention contain at least one dye of formula (II) where $R^8$ and $R^9$ are each as defined in the table which follows and * represents the bond to the phenyl radical:

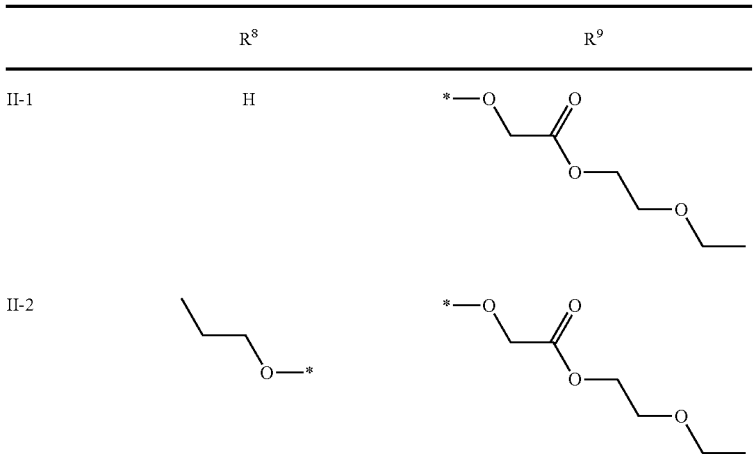

-continued

| | R⁸ | R⁹ |
|---|---|---|
| II-3 | propyl-O—* | H |
| II-4 | ethyl-O—* | H |
| II-5 | isopropyl-O—* | H |
| II-6 | butyl-O—* | H |
| II-7 | HO-propyl-O—* | H |
| II-8 | tetrahydrofurfuryl-O—* | H |
| II-9 | CH₃-O-CH₂-CH₂-O-C(O)-CH₂-O—* | H |
| II-10 | butyl-O-CH₂CH₂-O-CH₂CH₂-O—* | H |
| II-11 | CH₃-O-CH₂CH₂-O-C(O)-CH₂-O—* | propyl-O—* |
| II-12 | CH₃-O-CH₂CH₂-O-C(O)-CH₂-O—* | isopropyl-O—* |

Very particularly preferred dye mixtures according to the present invention contain the dyes of formulae Ia-11, Ia-23, Ia-24 and/or Ia-25 together with the dyes of formulae II-1, II-2, II-3, II-8 and/or II-1.

Dye mixtures according to the present invention which contain the dye of formula Ia-24 and the dye of formula II-3 are more particularly preferred.

The dye mixtures according to the present invention contain the dyes of formulae (I) and (II) more particularly in amounts each from 1% to 99% by weight, more preferably in amounts of in each case 20% to 80% by weight. Very particularly preferred dye mixtures according to the present invention contain dyes of formula (I) in amounts from 30% to 45% by weight and dyes of formula (II) in amounts from 55% to 70% by weight.

Suitable mixing ratios for dye of formula (I):dye of formula (II) are 90:10, 80:20, 75:25, 70:30, 60:40, 55:45, 50:50, 45:55, 40:60, 30:70, 25:75, 20:80 and 10:90.

The dye mixtures according to the present invention are obtainable by mechanically mixing the dyes of formulae (I) and (II). The amounts are more particularly chosen so as to produce mixtures having the desired compositions.

The dyes of formula (I) are known and are described for example in WO2008/049758. Similarly, the dyes of formula (II) are known and described for example in EP 0 033 583 A1 and EP 0 397 170 A1.

The dye mixtures according to the present invention are very useful for dyeing and printing hydrophobic materials in that the dyeings and prints obtained are notable for level shades and high service fastnesses. Deserving of particular mention are good wash and contact fastnesses and also excellent color buildup properties, especially on polyester and polyester-elastane materials.

The present invention thus also provides for the use of the dye mixtures of the present invention for dyeing and printing hydrophobic materials, i.e., processes for dyeing or printing such materials in a conventional manner wherein a dye mixture according to the present invention is used as a colorant.

The hydrophobic materials mentioned can be of synthetic or semisynthetic origin. Examples include secondary cellulose acetate, cellulose triacetate, polyamides, polylactides and more particularly high molecular weight polyesters. Materials composed of high molecular weight polyester are more particularly those based on polyethylene terephthalates or polytrimethylene terephthalates. Blend fabrics and blend fibers such as for example polyester-cotton or polyester-elastane are also possible. The hydrophobic synthetic materials can be present in the form of self-supporting film/sheeting or fabric- or thread-shaped bodies and may for example have been processed into yarns or woven or knitted textile fabrics. Preference is given to fibrous textile materials, which may also be present in the form of microfibers for example.

The dyeing in accordance with the use provided by the present invention can be effected in a conventional manner, preferably from an aqueous dispersion, if appropriate in the presence of carriers, at between 80 to about 110° C. by the exhaust process or in a dyeing autoclave at 110 to 140° C. by the HT process, and also by the so-called thermofix process, in which the fabric is padded with the dyeing liquor and subsequently fixed/set at about 180 to 230° C.

Printing of the materials mentioned can be carried out in a manner known per se by incorporating the dye mixtures of the present invention in a print paste and treating the fabric printed therewith at temperatures between 180 to 230° C. with HT steam, high-pressure steam or dry heat, if appropriate in the presence of a carrier, to fix the dye.

The dye mixtures of the present invention shall be in a very fine state of subdivision when they are used in dyeing liquors, padded liquors or print pastes. The dyes are converted into the fine state of subdivision in a conventional manner by slurrying them together with dispersants in a liquid medium, preferably water, and subjecting the mixture to the action of shearing forces to mechanically comminute the originally present dye particles to such an extent that an optimal specific surface area is achieved and sedimentation of the dye is minimized. This is accomplished in suitable mills, such as ball or sand mills. The particle size of the dyes is generally between 0.5 and 5 μm, and preferably equal to about 1 μm.

The dispersants used in the milling operation can be nonionic or anionic. Nonionic dispersants are for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained shall be pourable for most applications. Accordingly, the dye and dispersant content is limited in these cases. In general, the dispersions are adjusted to a dye content of up to 50 percent by weight and a dispersant content of up to about 25 percent by weight. For economic reasons, dye contents are in most cases not below 15 percent by weight. The dispersions may also contain still further auxiliaries, for example those which act as an oxidizing agent, for example sodium m-nitrobenzenesulfonate, or fungicidal agents, for example sodium o-phenylphenoxide and sodium pentachlorophenoxide, and particularly so-called "acid donors", examples being butyrolactone, monochloroacetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders contain the dye, dispersants and other auxiliaries, for example wetting, oxidizing, preserving and dustproofing agents and the abovementioned "acid donors".

A preferred method of making pulverulent dye preparations consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that a liquor ratio of 5:1 to 50:1 is obtained for dyeing. In addition, it is generally customary to add further dyeing auxiliaries, such as dispersing, wetting and fixing auxiliaries, to the liquors. Organic and inorganic acids such as acetic acid, succinic acid, boric acid or phosphoric acid are added to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye mixture in textile printing, the requisite amounts of the abovementioned dye formulations are kneaded in a conventional manner together with thickeners, for example alkali metal alginates or the like, and optionally further additives, for example fixation accelerants, wetting agents and oxidizing agents, to give print pastes.

The present invention also provides inks for digital textile printing by the ink jet process, said inks containing a dye mixture according to the present invention.

The inks of the present invention are preferably aqueous and contain dye mixtures of the present invention in amounts ranging for example from 0.1% to 50% by weight, preferably in amounts ranging from 1% to 30% by weight and more preferably in amounts ranging from 1% to 15% by weight based on the total weight of the ink. They further contain more particularly from 0.1% to 20% by weight of a dispersant. Suitable dispersants are known to a person skilled in the art, are commercially available and include for example sulfonated or sulfomethylated lignins, condensation products of aromatic sulfonic acids and formaldehyde, condensation products of optionally substituted phenol and formaldehyde, polyacrylates and corresponding copolymers, modified polyurethanes and reaction products of alkylene oxides with alkylatable compounds, for example fatty alcohols, fatty amines, fatty acids, carboxamides and optionally substituted phenols.

The inks according to the present invention may further contain the customary additives, for example viscosity moderators to set viscosities in the range from 1.5 to 40.0 mPas in the temperature range from 20 to 50° C. Preferred inks have a viscosity in the range from 1.5 to 20 mPas and particularly preferred inks have a viscosity in the range from 1.5 to 15 mPas.

Suitable viscosity moderators are rheological additives, for example polyvinyl caprolactam, polyvinylpyrrolidone and also their copolymers, polyetherpolyol, associative thickeners, polyurea, sodium alginates, modified galactomannans, polyetherurea, polyurethane and nonionic cellulose ethers.

By way of further additions, the inks according to the present invention may contain surface-active substances to set surface tensions in the range from 20 to 65 mN/m, which are adapted as appropriate depending on the process used (thermal or piezo technology).

Suitable surface-active substances are for example surfactants of any kind, preferably nonionic surfactants, butyldiglycol and 1,2-hexanediol.

The inks may further contain customary additions, for example substances to inhibit fungal and bacterial growth in amounts from 0.01% to 1% by weight based on the total weight of the ink.

The inks according to the present invention are obtainable in a conventional manner by mixing the components in water.

EXAMPLE 1 a) 50 parts of the dye (Ia-24)

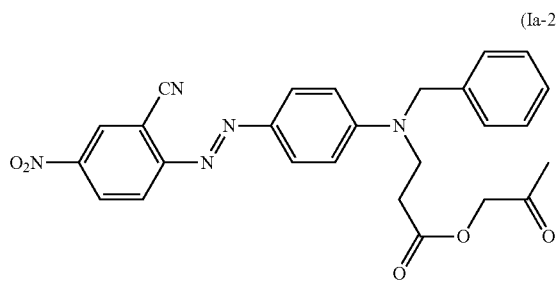

(Ia-24)

are mechanically mixed with 50 parts of the dye (II-3)

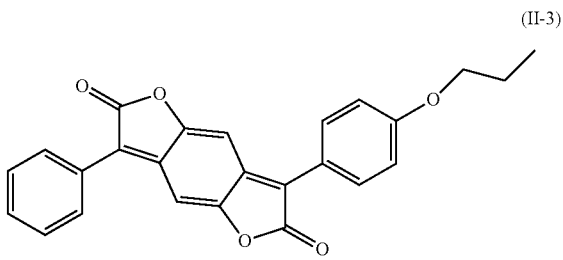 [SMILES: CCCOc1ccc(C2=c3cc4c(cc3OC2=O)=C(c2ccccc2)C(=O)O4)cc1]

(II-3)

Then, the mixture is ground as a 40% aqueous suspension with 100 parts of a high temperature stable dispersant until the particle size (diameter) has reached the size magnitude of 0.1-5 micrometers.

This dispersion is standardized to a solid product containing 25% of the dye mixture and 70% dispersant, by adding 99.7 parts of a "cutting agent" and by drying in a spray dryer either in powder form.

b) 2 g of the dye mixture obtained as per a) are dispersed in 100 ml of water at 40-50° C. A dyebath is prepared from 11.5 ml of this aqueous dispersion, 57.5 ml of deionized water and 1.2 ml of buffering solution (pH 4.5) and entered with a 5 g piece of polyester. The dyebath is heated to 130° C. and maintained at 130° C. for 45 minutes in a Werner Mathis high temperature dyeing machine. After rinsing with water and reduction clearing, the polyester material has a ruby red hue having excellent wash fastnesses. A particularly interesting property of this mixture is the excellent buildup behavior on polyester and polyester microfiber. Polyester microfiber requires proportionally more of the mixture to achieve a comparable depth of shade to conventional polyester.

Example 1 is repeated in similar fashion to obtain the dye mixtures of examples 2 to 20 according to the invention and use them for dyeing polyester. The table which follows indicates the fraction of the respective dye in % by weight based on the total dye content.

| | Dye | | | | | | | | |
|---|---|---|---|---|---|---|---|---|---|
| Example | Ia-11 | Ia-23 | Ia-24 | Ia-25 | II-1 | II-2 | II-3 | II-8 | II-10 |
| 2 | 30 | | | | 70 | | | | |
| 3 | 30 | | | | | | | 70 | |
| 4 | 25 | | | | 25 | 25 | 25 | | |
| 5 | 20 | | 20 | | 60 | | | | |
| 6 | | 50 | | | 50 | | | | |
| 7 | | 30 | 10 | | 40 | | | 20 | |
| 8 | | 48 | | | | | | 52 | |
| 9 | | 60 | | | | | 40 | | |
| 10 | | 80 | | | | | 20 | | |
| 11 | | 33 | 67 | | | | | | |
| 12 | | 46 | | | | 54 | | | |
| 13 | | 44 | | | | | | | 56 |
| 14 | | 44 | | | 31 | 14 | 11 | | |
| 15 | | 34 | | | 33 | 33 | | | |
| 16 | | 30 | | | | 35 | 35 | | |
| 17 | | 30 | | | 35 | | | 35 | |
| 18 | | | | 40 | 60 | | | | |
| 19 | | | | 40 | 10 | 10 | 10 | | |
| 20 | | | 20 | 10 | 70 | | | | |

EXAMPLE 21

A textile fabric consisting of polyester is pad-mangled with the liquor consisting of 50 g/l of 8% sodium alginate solution, 100 g/l of an 8-12% carob flour ether solution and 5 g/l of mononsodium phosphate in water and then dried. The wet pickup is 70%. The textile thus pretreated is printed with an aqueous ink prepared in accordance with the procedure described above and containing 3.5% of the dye of example 1, 2.5% of Disperbyk 190 dispersant, 30% of 1,5-pentanediol, 5% of diethylene glycol monomethyl ether, 0.01% of Mergal K9N biocide and 58.99% of water using a drop-on-demand (piezo) ink jet print head. The print is fully dried. Fixing is effected by means of superheated steam at 175° C. for 7 minutes. The print is subsequently subjected to an alkaline reduction clear, rinsed warm and then dried.

What is claimed is:
1. A dye mixture containing at least one dye of formula (Ia)
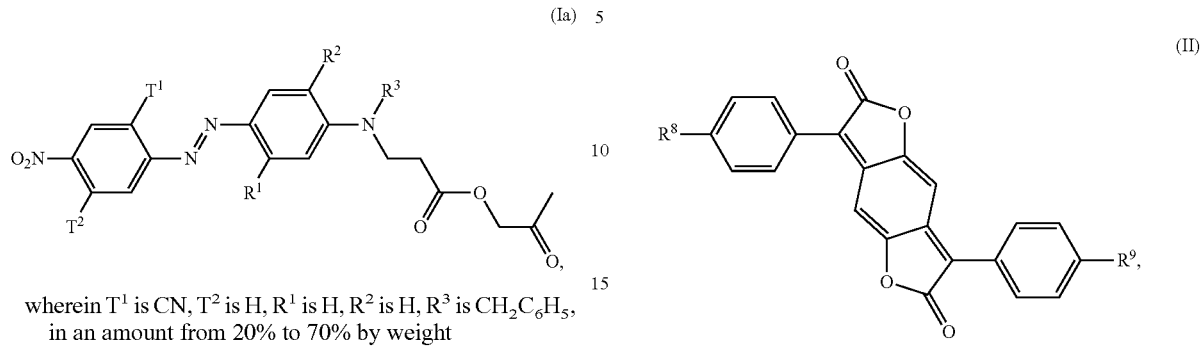
(Ia)
wherein $T^1$ is CN, $T^2$ is H, $R^1$ is H, $R^2$ is H, $R^3$ is $CH_2C_6H_5$, in an amount from 20% to 70% by weight
and at least one dye of formula (II)
(II)
wherein $R^8$ is
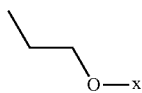
and wherein * represents the bond to the phenyl radical, and $R^9$ is H, in an amount from 80% to 30% by weight.
* * * * *